US010939228B2

(12) United States Patent
Arunkumar et al.

(10) Patent No.: US 10,939,228 B2
(45) Date of Patent: *Mar. 2, 2021

(54) MOBILE DEVICE LOCATION PROOFING

(71) Applicant: International Business Machines Corporation, Armonk, NY (US)

(72) Inventors: Saritha Arunkumar, Basingstoke (GB); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,681

(22) Filed: Jun. 6, 2019

(65) Prior Publication Data

US 2019/0289433 A1   Sep. 19, 2019

Related U.S. Application Data

(63) Continuation of application No. 14/940,415, filed on Nov. 13, 2015, now Pat. No. 10,368,185.

(30) Foreign Application Priority Data

Oct. 16, 2015   (GB) ..................... 1518339

(51) Int. Cl.
*H04W 24/00*   (2009.01)
*H04W 4/02*   (2018.01)
(Continued)

(52) U.S. Cl.
CPC ........... *H04W 4/02* (2013.01); *H04L 63/1466* (2013.01); *H04W 4/029* (2018.02); *H04W 12/00503* (2019.01)

(58) Field of Classification Search
CPC ....... H04W 12/06; H04W 4/02; H04W 4/023; H04W 4/021; H04W 4/029; H04W 64/00; H04W 12/02
See application file for complete search history.

(56) References Cited

U.S. PATENT DOCUMENTS 7,139,820 B1   11/2006   O'Toole, Jr. et al.
8,000,724 B1 *   8/2011   Rayburn ............... G01S 5/0027
                                                          455/456.3
(Continued)

FOREIGN PATENT DOCUMENTS

CA          2613692 A1     6/2009
WO   WO2011014292 A1     2/2011

OTHER PUBLICATIONS

Müller et al., "Adaptive String Dictionary Compression in In-Memory Column-Store Database Systems", 17th International Conference on Extending Database Technology (EDBT)—2014, Athens, Greece, Mar. 2014, pp. 283-294.
(Continued)

*Primary Examiner* — Khalid W Shaheed
(74) *Attorney, Agent, or Firm* — Scully, Scott, Murphy & Presser, P.C.; Scott Dobson, Esq.

(57) ABSTRACT

A computer implemented method, a computer program product and a computer system are disclosed that verify the location specified by a mobile device, for example when trying to gain access to a location-restricted service hosted by a computer system. This may be achieved by identifying at least one reference mobile device in the vicinity of the identified location of the first mobile device of which an identified location is to be verified, requesting from the at least one reference mobile device a reference location report including further pairing information identifying mobile devices with which the reference mobile device is paired; receiving the reference location report from the at least one
(Continued)

reference mobile device; and verifying the location identification in a first location report received from the first mobile device by identifying the first mobile device in the further pairing information in the received at least one reference location report.

20 Claims, 5 Drawing Sheets

(51) Int. Cl.
*H04W 4/029* (2018.01)
*H04L 29/06* (2006.01)
*H04W 12/00* (2021.01)

(56) References Cited

U.S. PATENT DOCUMENTS

| | | |
|---|---|---|
| 8,522,020 B2 | 8/2013 | Gerard |
| 8,531,332 B2 | 9/2013 | Gum et al. |
| 8,565,788 B2 | 10/2013 | Houri |
| 8,594,003 B2 | 11/2013 | Han et al. |
| 8,639,266 B2 | 1/2014 | Zelinka |
| 8,743,782 B1 | 6/2014 | Patel |
| 9,014,725 B2 | 4/2015 | Clough |
| 9,033,225 B2 | 5/2015 | Hefetz |
| 2009/0201850 A1 | 8/2009 | Davis et al. |
| 2011/0053605 A1* | 3/2011 | Carpio ............... G01S 5/0027 455/456.1 |
| 2012/0101818 A1 | 4/2012 | Scott et al. |
| 2012/0117064 A1 | 5/2012 | Draese et al. |
| 2013/0078991 A1 | 3/2013 | Nam |
| 2013/0303188 A1 | 11/2013 | Butala et al. |
| 2014/0087752 A1 | 3/2014 | Zhu et al. |
| 2014/0096180 A1 | 4/2014 | Negi et al. |
| 2014/0221012 A1* | 8/2014 | Uetabira ............... H04W 4/029 455/456.3 |
| 2014/0289822 A1 | 9/2014 | Wilson |
| 2015/0065166 A1 | 3/2015 | Ward et al. |
| 2015/0149091 A1 | 5/2015 | Milton et al. |
| 2015/0178305 A1 | 6/2015 | Mueller et al. |
| 2015/0365525 A1 | 12/2015 | Liu et al. |
| 2016/0077186 A1 | 3/2016 | Snapp |
| 2016/0219492 A1* | 7/2016 | Jung ................... H04W 12/08 |
| 2016/0285709 A1 | 9/2016 | Chaudhuri et al. |

OTHER PUBLICATIONS

Wang et al., "STAMP: Ad Hoc Spatial-Temporal Provenance Assurance for Mobile Users", 2013 21st IEEE International Conference on Network Protocols (ICNP), Oct. 2013, 10 pages.

List of IBM Patents or Patent Applications Treated As Related.

* cited by examiner

MOBILE DEVICE LOCATION PROOFING

CROSS-REFERENCE TO RELATED APPLICATION

This application is a continuation of copending U.S. patent application Ser. No. 14/940,415, filed Nov. 13, 2015, the entire contents and disclosure of which are hereby incorporated herein by reference.

BACKGROUND

Nowadays, mobile devices such as mobile phones are routinely capable of providing identification of their location. The mobile device may include a OPS module to determine its location using global positioning by satellite, may be adapted to identify its location by providing information about base stations to which the mobile device is connected such that the location of the mobile device can be approximated from a known location of one or more base stations to which the mobile device is connected, e.g. using triangulation methods, the mobile phone may be adapted to employ such triangulation techniques to estimate its own location from its affiliation with base stations having known positions, and so on. Many other location identification techniques are routinely available.

The ability of such mobile devices to provide an identification of their location has facilitated the provisioning of location-restricted services to such mobile devices. A service may be location-restricted for a number of reasons, for example because of copyright issues of content to be provided through the service, because of the service including a location-dependent response such as in the case of emergency services, because of location-dependent subscription to the service, e.g. a regional or national service subscription, and so on. In order to gain access to such a service, the mobile device when requesting access typically provides location information from which the service provider can deduce if the mobile device is entitled to gain access to the service.

Mobile devices may attempt to gain unauthorized access to a particular location-restricted service by spoofing their location, i.e. by providing false location information to the service provider. Methods exist that seek to verify location identification provided by a mobile device in order to detect location spoofing and prevent an unauthorized mobile device from falsely gaining access to a location-restricted service. Such methods for instance may rely on the exchange of time-stamped certificates between a mobile device and a wireless access point to the service provider, amongst other well-known spoofing prevention methods. Such methods may fail when the two parties involved in providing verification information for the location identification provided by the mobile device collude to falsify the verification process.

SUMMARY

According to an aspect, there is provided a computer-implemented method of verifying a location of a mobile device, the method comprising: receiving, on the computer, a first location report from a first mobile device, the first location report including a location identification for the first mobile device and pairing information identifying mobile devices with which the first mobile device is paired; identifying at least one reference mobile device in the vicinity of the identified location of the first mobile device; requesting from the at least one reference mobile device a reference location report including further pairing information identifying mobile devices with which the reference mobile device is paired; receiving the reference location report from the at least one reference mobile device; and verifying the location identification in the first location report received from the first mobile device by identifying the first mobile device in the further pairing information in the received at least one reference location report.

According to another aspect, there is provided a computer program product comprising a computer readable storage medium having computer readable program instructions embodied therewith for, when executed on a computer system comprising a processor arrangement adapted to provide a location-restricted service, causing the processor arrangement to, in response to receiving a first location report from a first mobile device, the first location report including a location identification for the first mobile device and pairing information identifying mobile devices with which the first mobile device is paired, identify at least one reference mobile device in the vicinity of the identified location of the first mobile device; requesting from the at least one reference mobile device a reference location report including further pairing information identifying mobile devices with which the reference mobile device is paired; receive the reference location report from the at least one reference mobile device; and verify the location identification in the first location report received from the first mobile device by identifying the first mobile device in the further pairing information in the received at least one reference location report.

According to yet another aspect, there is provided a computer system comprising a processor arrangement, a communication interface and a data storage device including the computer program product according to embodiments of the present invention, wherein the processor arrangement is communicatively coupled to the data storage device and is adapted to execute the computer readable program instructions of the computer program product; and the communication interface is communicatively coupled to the processor arrangement and is adapted to communicate with a plurality of mobile devices including the first mobile device and the at least one reference mobile device.

BRIEF DESCRIPTION OF THE DRAWINGS

Preferred embodiments of the present invention will now be described, by way of example only, with reference to the following drawings, in which.

DETAILED DESCRIPTION

Figure 1:
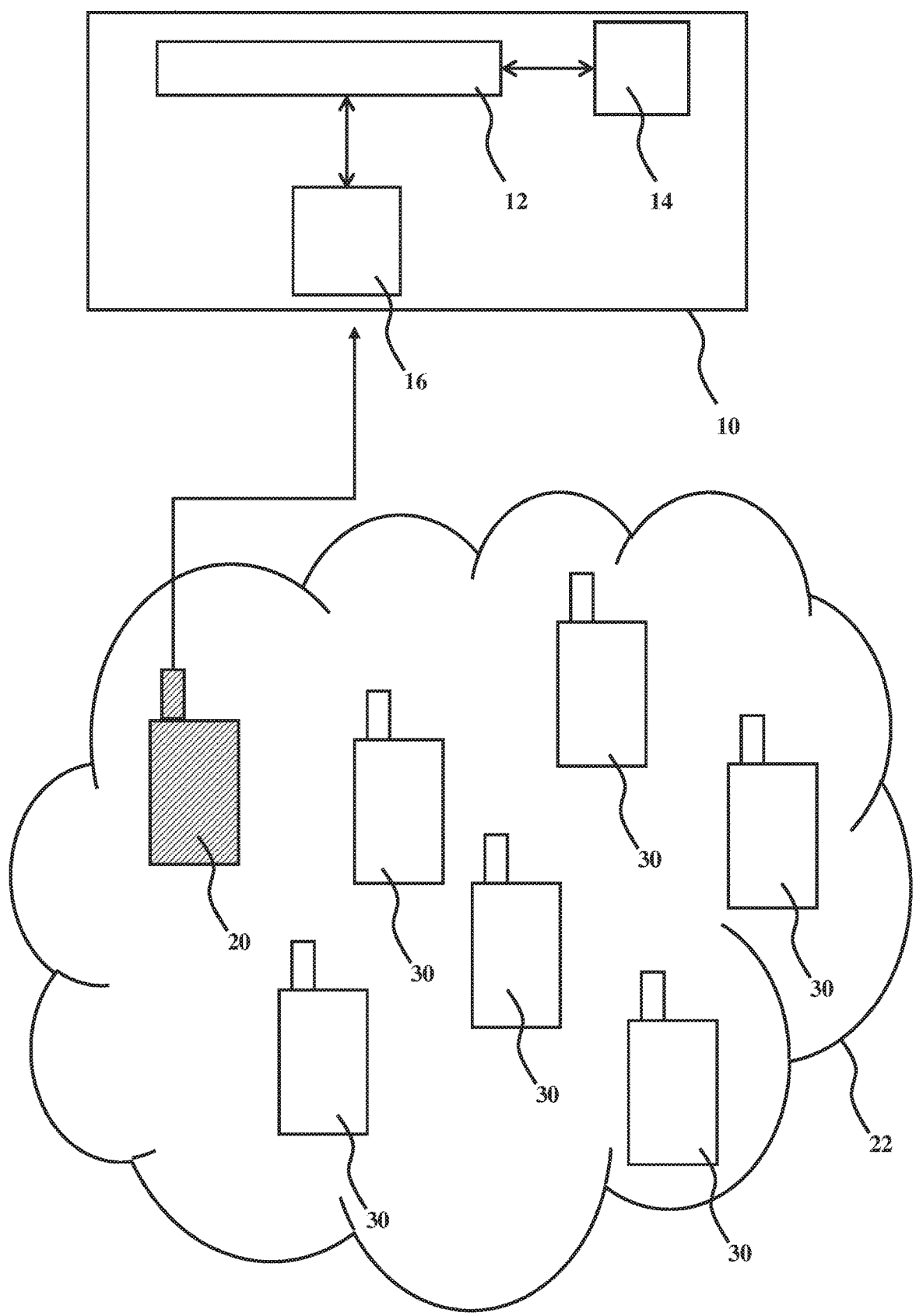
FIG. 1 schematically depicts a service provision scenario according to an embodiment.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e., is a computer-implementable method. The various steps of the method therefore reflect various parts of a computer program, e.g. various parts of one or more algorithms. The various steps of the methods or aspects thereof disclosed in this application may be executed in any suitable order and it should be understood that the order in which they are presented is by way of non-limiting example only. The skilled person will readily construct alternative sequences of steps that are equally feasible to execute such methods and should be understood that such alternative sequences are also covered by the spirit and scope of the embodiments disclosed herein.

In the context of the present application, reference is made to mobile devices. Such a mobile device may be any handheld or wearable electronic device operable by a user and capable of connecting to another electronic device for establishing a communication channel between the electronic device and the other electronic device over a network, which may be a communication channel over a wired or a wireless network. Typically, at least part of the communication channel is provided over a wireless network. The other electronic device may be a computer adapted to provide a service and/or resource to the mobile device over the established communication channel. In embodiments, the computer may be a network server or networked service provider. Examples of mobile devices include but are not limited to smart phones, tablet computers, personal digital assistants, smart glasses, smart watches, computers integrated in vehicles, and so on.

In the context of the present application, where reference is made to a mobile device in the vicinity of another mobile device, such vicinity implies that the mobile device and the other mobile device are in communicative range with each other such that the mobile device and the other mobile device may establish an P2P wireless connection with each other or a short-range wireless connection with each other via a wireless access point using short-range communication techniques such as WiFi communication, Bluetooth communication, near-field communication (NFC) and so on. Such a P2P or indirect wireless connection between mobile devices will also be referred to as a pairing. In example embodiments, the mobile device and the other mobile device may be arranged to establish a pairing as part of an ad hoc network such as a zero configuration network, in which a mobile device may search or browse its environment to detect available services, e.g. in the form of connections to other mobile devices in its environment, and connect to these services, e.g. by pairing with another mobile device or another service provider.

F10.1 schematically depicts a typical scenario according to an embodiment. A computer system 10 provides a service, typically a location-restricted service. To this end, the computer system 10 typically comprises a processor arrangement 12 communicatively coupled to a data storage device 14 and to a communication interface 16 for communicating with one or more mobile devices requesting access to a service provided by the computer system 10. Such mobile devices may also be referred to as client devices, whilst the computer system 10 may also be referred to as a host device, i.e. a device hosting a service.

The computer system 10 may be any type of computer system that can be accessed by a client device 20 over a network such as an at least partially wireless network, for example a 20, 30, 40 or 50 mobile communication network, a Wi-Fi network, and so on. The network may be partially wired, for example a wired connection between a base station adapted to communicate with the client device in a wireless fashion and to communicate with the computer system 10 over a wired connection. Alternatively, such a base station or the like may form part of the computer system 10, e.g. may be or may form part of the communication interlace 16.

The computer system 10 may be a standalone computer, e.g. a standalone server, or may contain a plurality of such computers, which may be spatially clustered, e.g. within a single computer housing, within a server rack, within a plurality of adjacent server racks in a space such as a data center, and so on, or may be spatially distributed. Where the computer system 10 comprises one or more computers acting as servers, each computer may be individually one of a network server, an application server, or a blade server and so on. Two or more networked servers may share in the execution of at least portions of a same application, program, function, or other assemblage of programmable and executable code.

The processor arrangement 12 may be any suitable processor arrangement, such as a single processor or a plurality of processors configured to cooperate within the computer system 10. Any suitable type of processor, e.g. single core or multi-core processors, ASICs, and so one may be used for this purpose.

The data storage device 14 may be any suitable data storage device such as a memory device forming part of the processor arrangement 12, a discrete memory device spatially separated from the processor arrangement 12, a magnetic or optical storage device, which may be a stand-alone device or a device integrated in a storage solution such as a storage area network or network attached storage device, a cloud-based storage device, and so on. The data storage device 14 may store a computer program product including program instructions for execution by the processor arrangement 12 to implement embodiments of the location verification method described in more detail below.

The communication interface 16 adapted to communicate with client devices, e.g. mobile devices requesting access to a service provided by the computer system 10, may be any suitable communication interface, e.g. a wireless communication interface, a wired communication interface such as a network card or the like, and so on.

According to an aspect, a mobile device 20 may seek access to a location-restricted service provided by the computer system 10. To this end, the mobile device 20 will contact the computer system 10 in any suitable manner as previously explained and send the computer system 10 a service access request. According to an embodiment, the service access request includes a location report containing a location identification of the mobile device 20 as well as a list of device pairings between the mobile device 20 and further mobile devices 30 in the vicinity of the mobile device 20. Such pairings for instance may have been created by the mobile device 20 sensing the presence of a further mobile device 30 in its vicinity 22, for example by means of a short-range communication between the mobile device 20 and the further mobile device 30, e.g. a Bluetooth, Wi-Fi or other type of NFC communication. Such mobile device pairing is known per se from for instance ad-hoc networking techniques such as zero-configuration networking and the pairing between mobile devices 20, 30 may be achieved using any suitable known pairing technique. The mobile devices 20, 30 typically keep track of the mobile devices they are paired with, e.g. by maintaining a list, log or the like of such pairings.

Figure 2:
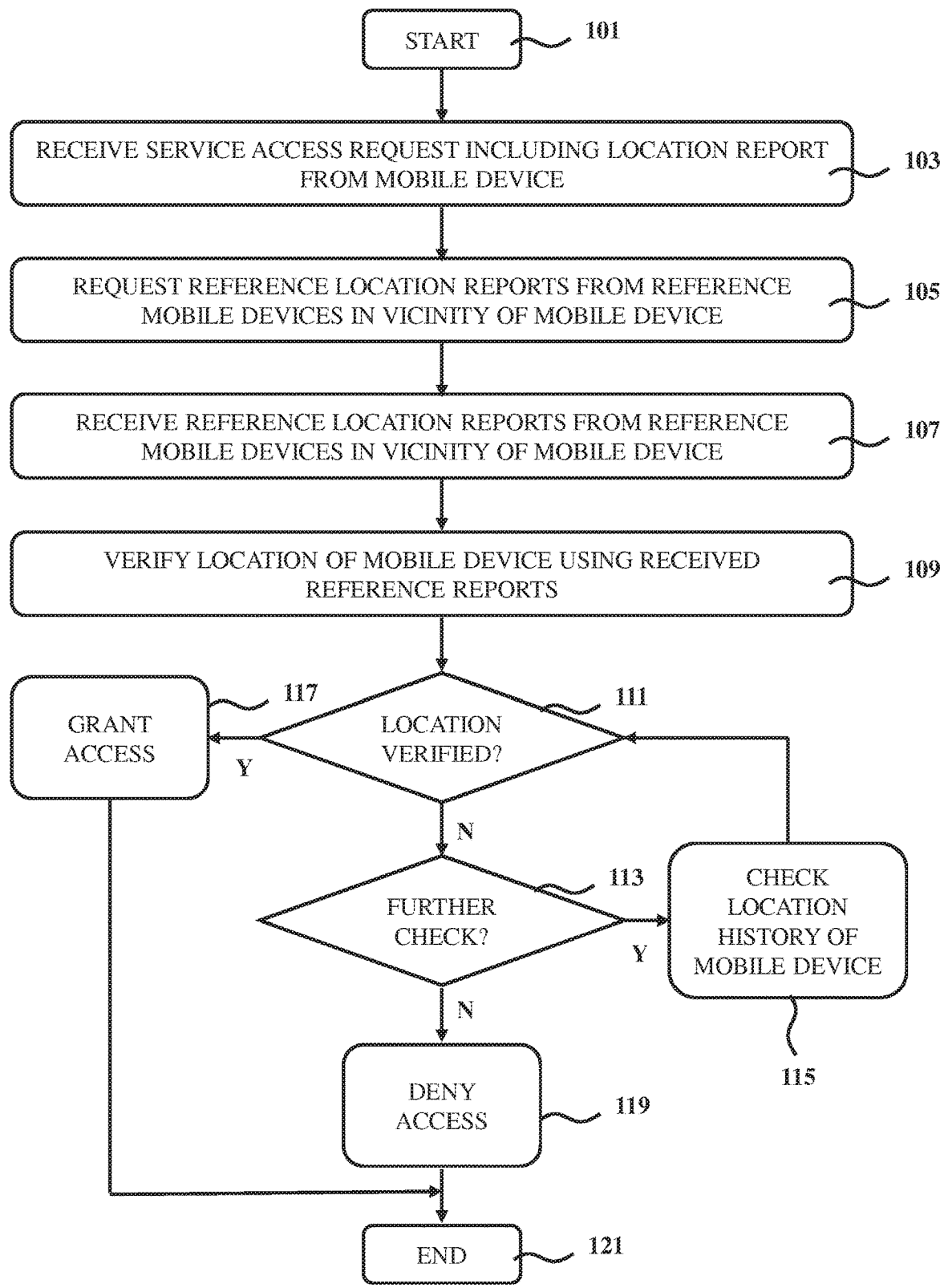
FIG. 2 is a flowchart of a location verification method according to an embodiment.

This pairing behavior may be utilized by the computer system 10 to verify the location identification provided in the location report submitted by the mobile device 20 in accordance with a location verification method 100, an embodiment of which is schematically depicted by the flowchart in FIG. 2.

The method 100 starts in 101, for example with the computer system 10 accepting service requests from mobile devices 20, 30. In 103, the computer system 10 receives a service access request from the mobile device 20, which service access request includes a location report comprising a location identification of the location of the mobile device 20 and pairing information identifying further mobile devices 30 in the vicinity of the mobile device 20 with which the first mobile device 20 is paired.

In order to verify the identified location of the mobile device 20, the computer system 10 looks for further mobile devices 30 in the vicinity of the identified location of the mobile device 20 and requests in 105 that the identified further mobile devices 30 each provide reference location reports at least including pairing information of the mobile devices in the vicinity of these reference mobile devices 30 to which these reference mobile devices 30 are paired. At least some of the reference mobile devices 30 may be identified from the pairing information provided by the mobile device 20 although in some embodiments this is avoided to reduce the risk that the verification of the location of the mobile device 20 is at least partially based on pairing information provided by reference mobile devices 30 that are colluding with the mobile device 20 to spoof the location of the mobile device 20. In an embodiment, the pool of reference mobile devices 30 may be selected independent of the mobile devices identified in the pairing information provided by the mobile device 20, such that the pool of reference mobile devices 30 may or may not include some of the mobile devices identified in the pairing information provided by the mobile device 20.

In 107, the computer system 10 receives the reference location reports from the reference mobile devices 30 selected in 105. The reference location reports at least comprise pairing information for the associated reference mobile device 30, that is, information identifying the mobile devices in the vicinity of the reference mobile device 30 with which the reference mobile device 30 is paired. The reference location reports in at least some embodiments may further comprise a location identification of the associated reference mobile device 30, which has the benefit that a single format location report may be generated by a mobile device either when requesting access to a service provided by the computer system 10 or when providing a reference for a service-requesting mobile device 20 to the computer system 10.

Next, the computer system 10 verifies in 109 the location identified in the location report received from the service access-requesting mobile device 20. In an embodiment, the computer system 10 may evaluate the reference location reports received from the one or more reference mobile devices 30 by evaluating the pairing information in these reference location reports. If at least some of the reference mobile devices 30 are paired with the mobile device 20, this may serve as a verification of the location provided by the mobile device 20 in its location report such that the computer system 10 may decide in 111 that the location of the mobile device 20 has been satisfactorily verified. Such a decision for instance may be reached when at least a predetermined fraction of the reference mobile devices 30 sense the presence of the mobile device 20 as evidenced by the pairing information provided by these reference mobile devices 30 in their reference location reports. The level of the predetermined fraction, e.g. 60% of all reference model devices 30, 80% of all reference mobile devices 30, 90% of all reference mobile devices 30, and so on, may be considered a trust value based on which access to the requested service may be provided. Different types of location-restricted services may be associated with different minimal trust values to ensure that access to such services is only provided if a predetermined level of trust has been established.

In an alternative embodiment, the computer system 10 may verify the location identified by the mobile device 20 in its location report by performing a consistency check between the pairing information provided by the mobile device 20 and the pairing information provided by the reference mobile devices 30 in their reference location reports. This for instance may be done in order to reduce the risk that the location identified by the mobile device 20 in its location report is incorrectly verified by the computer system 10 due to several reference mobile devices 30 colluding with the mobile device 20 to spoof the location of the mobile device 20, for example by faking pairing information and sharing the faked pairing information between the colluding mobile devices.

Figure 3:
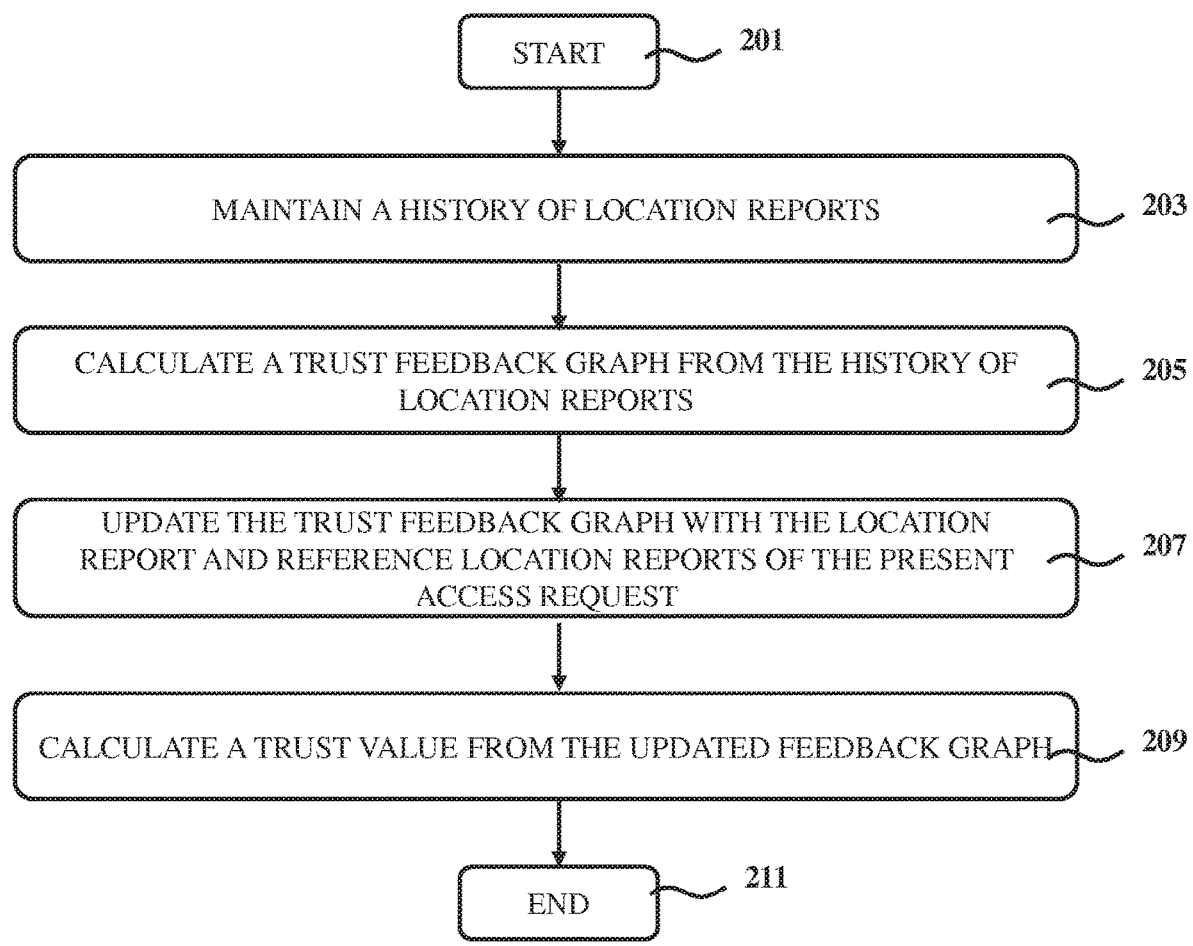
FIG. 3 is a flowchart of an aspect of a location verification method according to an embodiment.

An embodiment of such an alternative verification 109 is schematically depicted in FIG. 3, which depicts a flowchart of such an alternative verification method. This embodiment is based on the insight that a large number of further mobile devices 30 may be present in the vicinity 22 of the mobile device 20, where the mobile device 20 may only be paired to a (small) subset of these further mobile devices 30, such that there are at least a number of further mobile devices 30 for which it is unlikely that they may be colluding with the mobile device 20.

The alternative verification method 109 starts in 201 after which the method proceeds to 203 in which a history of location reports received in relation to the mobile device 20 is stored by the computer system 10. Such a history typically comprises the location reports generated by the mobile device 20 and the reference location reports generated by reference mobile devices 30 during previous verifications of the location of the mobile device 20. Consequently, for a mobile device 20 that previously has consistently provided genuine location identifications, this facilitates the establishing of trusted pairings of the mobile device 20 with further mobile devices 30 in its vicinity 22, in particular where the mobile device 20 regularly requests access to a particular service from the same location. This for instance utilizes typical mobile device usage behavior, where mobile devices 20 can be regularly found in the same location, with the same further mobile devices 30 regularly in the vicinity 22 of the mobile device 20, such as at a place of work, a place of residence, a shopping location, a sports venue, and so on.

Figure 4:
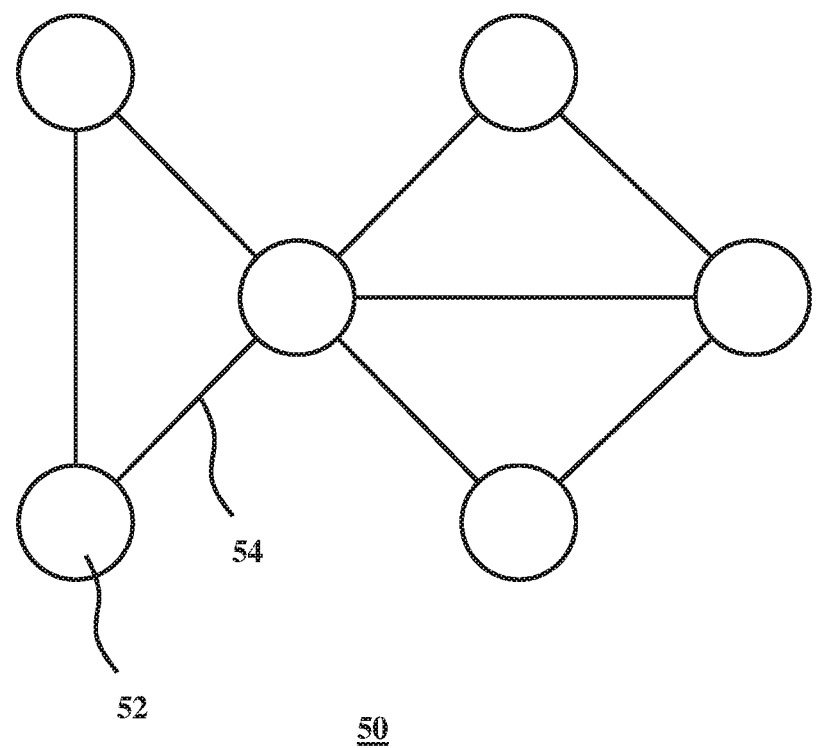
FIG. 4 schematically depicts a trust feedback graph according to an aspect of a location verification method according to an embodiment.

In order to perform such a consistency check, the computer system 10 may calculate in 205 a trust feedback graph from this history of location reports. FIG. 4 schematically depicts a trust feedback graph 50 having nodes 52 that represent the mobile device 20 and the various mobile devices 30 to which the mobile device 20 has been paired, which pairings are represented by the edges 54 between the nodes 52.

The computer system 10 may calculate the trust feedback graph 50 by assigning a trust feedback score to each edge 54 and updating the trust feedback score of each edge 54 whenever a service access request or a location report is received from the mobile device 20. In an embodiment, the trust feedback score F is expressed as the number of consistent pairing reports M received by the computer system 10 divided by the total number of pairing reports received by the computer system 10, which typically is the sum of the consistent pairing reports M and inconsistent pairing reports N:

$$F=M/(M+N)$$

A pairing report is a pairing of a location report provided by the mobile devices represented by nodes 52 on either side of an edge 54, i.e. first and second mobile devices that at some stage have been paired to each other, e.g. the mobile device 20 and one of the reference mobile devices 30.

A consistent pairing report is a pairing report in which when the first mobile device reports a pairing with the second mobile device in its pairing information, the second mobile device also reports a pairing with the first mobile device in its pairing information or in which when the first mobile device does not report a pairing with the second mobile device in its pairing information, the second mobile device also does not report a pairing with the first mobile device in its pairing information. Such a pairing report may be considered a trustworthy pairing report. In case of a consistent pairing report, the value M may be increased by a predetermined value, e.g. by 1, such that the trust feedback score F is increased correspondingly.

An inconsistent pairing report is a pairing report in which when the first mobile device reports a pairing with the second mobile device in its pairing information, the second mobile device does not report a pairing with the first mobile device in its pairing information or in which when the first mobile device does not report a pairing with the second mobile device in its pairing information, the second mobile device reports a pairing with the first mobile device in its pairing information. An inconsistent pairing report may be indicative of a location spoofing attempt. In case of an inconsistent pairing report, the value N may be increased by a predetermined value, e.g. by 1, such that the trust feedback score F is decreased correspondingly.

The thus obtained graph 50 may be processed by the computer system 10 using a suitable graph processing algorithm in order to calculate in 209 a trust value for the location identified by the requesting mobile device 20 in its location report. For example, suitable graph processing algorithms include graph-based trust algorithms such as EigenTrust, which converts the graph 50 into a matrix in which each entry contains a representation of a trust feedback score, and where calculation of the principal eigenvector of this matrix gives a global trust value for the nodes 52 in the graph 50, i.e. a global trust value for the location identification provided by a mobile device represented by the node 52. This algorithm is explained in more detail by S. D Kamvar et al. in "The eigentrust algorithm for reputation management in P2P networks", Proceedings of the 12th International conference on World Wide Web, pages 640-651, ACM, 2003.

An alternative example of suitable graph-based trust algorithm is PeerTrust, in which a trust value is computed for a node 52 based on the number of feedback instances and the credibility of the feedback instances. This algorithm is explained in more detail by L.Xiong et al. in "Peertrust: Supporting reputation-based trust for peer-to-peer electronic communities" in IEEE Transactions on Knowledge and Data Engineering, 16(7), 843-857, 2004. Other suitable algorithms, such as page ranking algorithms, will be apparent to the skilled person. Upon calculating this trust value in 209, the verification method 109 may terminate in 211.

Now, upon returning to FIG. 1, the computer system 10 may check in 111 if the location identified by the mobile device 20 has been satisfactorily verified using any of the aforementioned verification methods or equivalents thereof. This for instance may comprise comparing a calculated trust value with a trust threshold, such as a threshold associated with a particular location-restricted service and determining that the location identified by the mobile device 20 has been satisfactorily verified in the calculated trust value at least meets or exceeds this threshold. If this is the case, the method 100 executed by the computer system 10 may proceed to 117 in which the mobile device 20 is granted access to the requested service after which the method 100 may terminate in 121.

However, if in 111 the computer system 10 determines that the location identified by the mobile device 20 in its location report has not been satisfactorily verified, for example because its trust value falls below a predetermined trust threshold such as a trust threshold associated with a particular location-restricted service, the computer system 10 may decide in 113 if a further consistency check is to be applied to the location identified by the mobile device 20 in its location report. If the computer system 10 decides that such a further check is not desirable or appropriate, the computer system 10 may refuse the mobile device 20 access to the requested service in 119 after which the method 100 may terminate in 121.

On the other hand, if the computer system 10 decides that a further consistency check is required or desirable, for example because a trust value of the location identification provided by the mobile device 20 lies in between a request rejection threshold and a request acceptance threshold, which respective thresholds may be associated with a specific location-restricted service, the computer system 10 may invoke a further consistency check in 115 before reverting to 111 to check if the further consistency check has resulted in a satisfactory verification of the location identified by the mobile device 20 in its location report.

Figure 5:
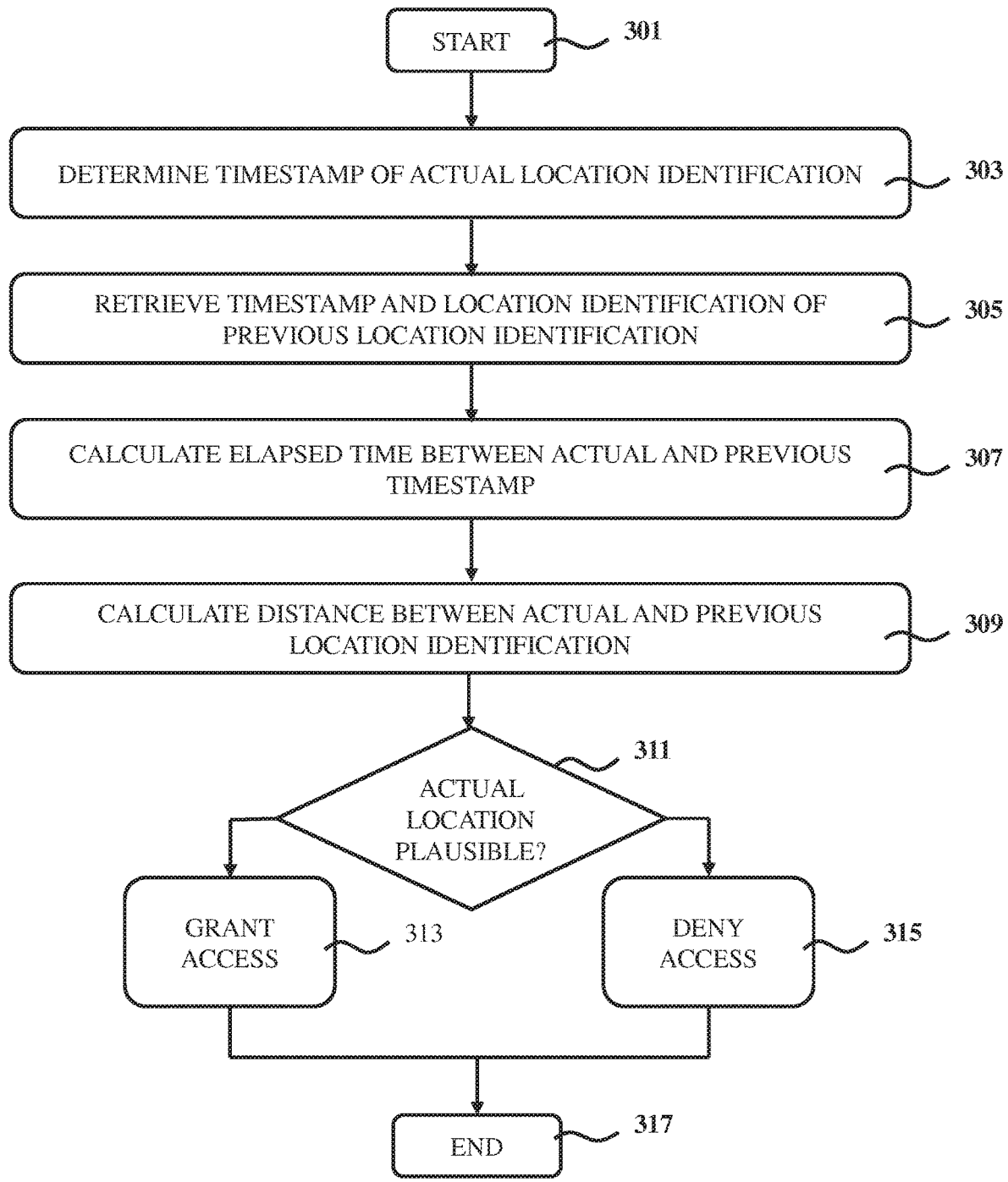
FIG. 5 is a flowchart of another aspect of a location verification method according to an embodiment.

The further consistency check may be any known spoofing check such that the risk of spoofing is reduced by the use of complementary spoofing verification methods. However, in a particularly preferred embodiment, the further consistency check is implemented in accordance with the flowchart depicted in FIG. 5. In this embodiment, the consistency check starts in 301 before proceeding to 303 in which a timestamp is determined for the actual location identification received in the location report from mobile device 20. This for instance may be achieved by the computer system 10 generating the timestamp when the location report from the mobile device 20 is received although other methods of generating a reliable timestamp will be apparent to the skilled person.

Next, in 305, the computer system 10 retrieves the most recent previous location report received from the mobile device 20, which may have been a previous request for accessing a particular location restricted service may have been a reference location report to aid verification of the location provided by another mobile device in trying to access a location-restricted service provided by the computer system 10. The computer system 10 retrieves the timestamp assigned to the most recent previous location report received from a mobile device 20 and the location identification in this most recent previous location report.

The computer system 10 subsequently calculates in 307 the elapsed time between the previous timestamp and the actual timestamp and calculates in 309 the distance between the location identified in the previous location report and the location identified in the actual location report In 311, the computer system 10 determines if it is plausible that the mobile device 20 has traveled the distance between the previous location as identified in the previous location report and the actual location as identified in the actual location report in the determined amount of time elapsed between the generation of the previous location report and the actual location report. For example, a mobile device 20 claiming to have travelled from London to New York in less than four hours is likely to spoof its location such that the actual location identified in the actual location report received from the mobile device 20 is unlikely to be plausible, i.e. is likely to be spoofed.

The computer system 10 may access a database, lookup table or any other suitable data storage medium containing typical travel times between various locations across the globe in order to assist the computer system 10 in assessing in 311 whether it is plausible that the mobile device 20 could travel from its previous location to its actual location in the elapsed time between the generation of the previous and actual location reports. Alternatively, the program instructions executed by the processor arrangement 12 of the computer system 10 when executing embodiments of the method of the present invention may include an algorithm for calculating a plausible journey time between the previous and actual locations identified by the mobile device 20 in its previous and actual location reports respectively and comparing the plausible journey time with the time elapsed between the generation of the previous and actual location reports received from the mobile device 20 in order to assess whether it is plausible that the mobile device 20 actually is in the location identified in its actual location report.

If the computer system 10 decides in 311 that the actual location provided by the mobile device 20 is plausible, the computer system 10 may decide in 313 to grant the mobile device 20 access to the requested service, otherwise, the computer system 10 may decide in 315 to deny the mobile device 20 access to the requested service. In this manner, an additional consistency check is provided in addition to the evaluation of the reference location reports provided by the reference mobile devices 30, which further reduces the risk that access to a location-restricted service is provided to a mobile device 20 spoofing its location.

Embodiments of the present invention may be embodied by a (computer) system, a computer-implemented method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A computer-implemented method of verifying a location of a mobile device, the method comprising:
receiving, on a computer system, a request from a first mobile device for access to a location-restricted service provided by the computer system, including receiving a first location report from the first mobile device, the first location report including a location identification for the first mobile device and pairing information identifying mobile devices with which the first mobile device is paired;
selecting a pool of reference mobile devices independent of the pairing information in the location identification received from the first mobile device;
identifying at least one of the reference mobile devices, from the pool of reference mobile devices, in the vicinity of the identified location of the first mobile device;
requesting from the at least one reference mobile device a reference location report including further pairing information identifying mobile devices with which the reference mobile device is paired;
receiving the reference location report from the at least one reference mobile device; and
evaluating the received reference location report to check whether the received reference location report verifies the location identification for the first mobile device in the first location report received from the first mobile device, including
verifying the location identification in the first location report received from the first mobile device by identifying the first mobile device in the further pairing information in the received at least one reference location report; and
when the location identification in the first location report is verified, granting the first mobile device access to the requested location-restricted service.

2. The computer-implemented method, wherein each reference location report further comprises a reference location identification of the reference mobile device.

3. The computer-implemented method of claim 1, wherein:
the further pairing information identifies each of the mobile devices with which the reference mobile device is paired by a further device identifier; and
verifying the location identification in the first location report received from the first mobile device by identifying the first mobile device in the further pairing information in the received at least one reference location report comprises:
comparing a device identifier of the first mobile device with the one or more further device identifiers in the further pairing information.

4. A computer-implemented method of claim 1, wherein verifying the location identification in the location report received from the first mobile device by identifying the first mobile device in the further pairing information in the received at least one reference location report further comprises determining a consistency between the pairing information and the further pairing information.

5. The computer-implemented method of claim 4, further comprising maintaining a history of location reports, the history including historical first location reports and historical reference location reports for referencing the historical first location reports.

6. The computer-implemented method of claim 5, further comprising calculating a trust value for the verified location identification from the history of location reports.

7. The computer-implemented method of claim 6, wherein calculating a trust value for the verified location identification from the history of location reports comprises:
generating a trust feedback graph comprising nodes representing the first mobile device and the at least one reference device and edges between nodes representing by a trust feedback score for historically reported pairings between the mobile devices represented by the nodes interconnected by the edges; and
calculating the trust value from the trust feedback graph.

8. The computer-implemented method of claim 7, further comprising updating the trust feedback graph by, for each pairing of the first location report and a reference location report:
comparing the pairing information in the first location report with the pairing information in the reference location report;
increasing the trust feedback score of the edge between the node representing the first mobile device and the node representing the reference mobile device if the pairing information for the pairing between the first mobile device and the reference mobile device is consistent in the first location report and the reference location report;

decreasing the trust feedback score of the edge between the node representing the first mobile device and the node representing the reference mobile device if the pairing information for the pairing between the first mobile device and the reference mobile device is inconsistent in the first location report and the reference location report; and calculating the trust value from the updated trust feedback graph.

9. The computer-implemented method of claim 7, wherein calculating the trust value from the trust feedback graph comprises calculating the trust value using the EigenTrust or PeerTrust algorithm.

10. The computer-implemented method of claim 7, further comprising granting the mobile device access to a service provided by the computer if the trust value at least meets a minimum value.

11. The computer-implemented method of claim 5, further comprising:
performing an additional verification of the location identification in the first location report received from the first mobile device by:
determining the actual point in time at which the first location report is received; retrieving the most recent historical first location report from the history;
determining a time difference between the actual point in time and a previous point in time in the history at which the most recent historical first location report was received;
determining a distance between the location identified in the location report and a previous location identified in the most recent historical first location report; and
verifying the location identification based on the determined time difference and the determined distance.

12. The computer-implemented method of claim 11, comprising performing the additional verification of the location identification in the first location report received from the first mobile device in response to a trust value for the verified location identification calculated from the history of location reports being below a minimum threshold.

13. The computer-implemented method of claim 5, further comprising adding the first location report of the mobile device and the reference location report from the at least one reference mobile device to the history.

14. A computer program product comprising a computer readable storage medium having computer readable program instructions embodied therewith for, when executed on a computer system comprising a processor arrangement adapted to provide a location-restricted service, causing the processor arrangement to:
receive a request from a first mobile device for access to a location-restricted service provided by the computer system, including receiving a first location report from the first mobile device, the first location report including a location identification for the first mobile device and pairing information identifying mobile devices with which the first mobile device is paired;
select a pool of reference mobile devices independent of the pairing information in the location identification received from the first mobile device;
in response to receiving the first location report, identify at least one of the reference mobile devices, from the pool of reference mobile devices, in the vicinity of the identified location of the first mobile device;
request from the at least one reference mobile device a reference location report including further pairing information identifying mobile devices with which the reference mobile device is paired;
receive the reference location report from the at least one reference mobile device; and
evaluate the received reference location report to check whether the received reference location report verifies or does not verify the location identification for the first mobile device in the first location report received from the first mobile device, including
verify the location identification in the first location report received from the first mobile device by identifying the first mobile device in the further pairing information in the received at least one reference location report; and
when the location identification in the first location report is verified, granting the first mobile device access to the requested location-restricted service.

15. The computer program product of claim 14, further comprising computer readable program instructions embodied with the computer readable storage medium for, when executed on the processor arrangement of the computer system adapted to provide a location-restricted service, causing the processor arrangement to:
maintain a history of location reports, the history including historical first location reports and historical reference location reports for referencing the historical first location reports; and
calculate a trust value for the verified location identification from the history of location reports.

16. The computer program product of claim 15, further comprising computer readable program instructions embodied with the computer readable storage medium for, when executed on the processor arrangement of the computer system adapted to provide a location-restricted service, causing the processor arrangement to:
generate a trust feedback graph comprising nodes representing the first mobile device and the at least one reference device and edges between nodes representing by a trust feedback score for historically reported pairings between the mobile devices represented by the nodes interconnected by the edges;
update the trust feedback graph by, for each pairing of the first location report and a reference location report:
compare the pairing information in the first location report with the pairing information in the reference location report;
increase the trust feedback score of the edge between the node representing the first mobile device and the node representing the reference mobile device if the pairing information for the pairing between the first mobile device and the reference mobile device is consistent in the first location report and the reference location report;
decrease the trust feedback score of the edge between the node representing the first mobile device and the node representing the reference mobile device if the pairing information for the pairing between the first mobile device and the reference mobile device is inconsistent in the first location report and the reference location report; and
calculate the trust value from the updated trust feedback graph.

17. The computer program product of claim 15, further comprising computer readable program instructions embodied with the computer readable storage medium for, when executed on the processor arrangement of the computer system adapted to provide a location-restricted service, causing the processor arrangement to:
perform an additional verification of the location identification in the first location report received from the first mobile device by:
determining the actual point in time at which the first location report is received;
retrieving the most recent historical first location report from the history;
determining a time difference between the actual point in time and a previous point in time in the history at which the most recent historical first location report was received;
determining a distance between the location identified in the location report and a previous location identified in the most recent historical first location report; and
verifying the location identification based on the determined time difference and the determined distance.

18. A computer system comprising a processor arrangement, a communication interface and a data storage device including the computer program product of claim 14, wherein:
the processor arrangement is communicatively coupled to the data storage device and is adapted to execute the computer readable program instructions of the computer program product; and
the communication interface is communicatively coupled to the processor arrangement and is adapted to communicate with a plurality of mobile devices including the first mobile device and the at least one reference mobile device.

19. The computer system of claim 18, wherein the computer system is adapted to provide a location-restricted service, and wherein the location identification received from the first mobile device forms part of a request by the first mobile device to access the location-restricted service, the computer system being further adapted to grant the first mobile device access to the location-restricted service upon successful verification the location of the first mobile device.

20. The method according to claim 1, wherein the identifying at least one reference mobile device includes selecting the at least one reference mobile device independent of the mobile devices identified in the pairing information received from the first mobile device.

* * * * *